United States Patent
Kaidu et al.

(10) Patent No.: US 10,236,804 B2
(45) Date of Patent: Mar. 19, 2019

(54) MOTOR DRIVING CONTROL DEVICE AND MOTOR DRIVING CONTROL METHOD

(71) Applicant: Minebea Mitsumi Inc., Nagano (JP)

(72) Inventors: Hiroyuki Kaidu, Iwata (JP); Youhei Serizawa, Kakegawa (JP); Masato Aoki, Iwata (JP); Xiao Zhou, Fukuroi (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days.

(21) Appl. No.: 15/898,735

(22) Filed: Feb. 19, 2018

(65) Prior Publication Data

US 2018/0248499 A1    Aug. 30, 2018

(30) Foreign Application Priority Data

Feb. 24, 2017 (JP) .................. 2017-033625

(51) Int. Cl.
| | |
|---|---|
| *H02P 6/08* | (2016.01) |
| *H02P 6/17* | (2016.01) |
| *H02P 21/14* | (2016.01) |
| *H02P 27/08* | (2006.01) |
| *H02P 29/024* | (2016.01) |
| *H02P 29/032* | (2016.01) |

(52) U.S. Cl.
CPC .............. *H02P 6/08* (2013.01); *H02P 21/14* (2013.01); *H02P 27/08* (2013.01); *H02P 29/027* (2013.01); *H02P 29/032* (2016.02); *H02P 6/17* (2016.02)

(58) Field of Classification Search
CPC ..................................... H02P 6/08; H02P 6/17
USPC .......................................................... 318/434
See application file for complete search history.

(56) References Cited

U.S. PATENT DOCUMENTS

| | | | | |
|---|---|---|---|---|
| 7,911,168 | B2* | 3/2011 | Koike | G03G 15/5008 318/432 |
| 8,796,967 | B2* | 8/2014 | Sato | H02P 6/12 318/400.01 |
| 2004/0104695 | A1* | 6/2004 | Hahn | H02P 6/28 318/400.22 |
| 2017/0141709 | A1* | 5/2017 | Fukuda | H02P 7/06 |

FOREIGN PATENT DOCUMENTS

JP        2001-086785 A       3/2001

* cited by examiner

*Primary Examiner* — Erick D Glass
(74) *Attorney, Agent, or Firm* — Pearne & Gordon LLP

(57) ABSTRACT

The control circuit includes a current detecting part detecting a driving current of the motor, a set duty generating part generating a set duty for outputting the driving control signal based on the speed command information and the actual rotational frequency information, a limit value determining part determining a current limit value based on the set duty and an instructed duty corresponding to the speed command information and a limiting part limiting the driving current of the motor based on the driving current of the motor detected by the current detecting part and the current limit value determined by the limit value determining part.

10 Claims, 8 Drawing Sheets

MOTOR DRIVING CONTROL DEVICE AND MOTOR DRIVING CONTROL METHOD

CROSS REFERENCE TO RELATED APPLICATIONS

This application claims the benefit of Japanese Patent Application No. 2017-033625, filed Feb. 24, 2017, which is hereby incorporated by reference in its entirety.

BACKGROUND

Technical Field

The present disclosure relates to a motor driving control device and a motor driving control method, and more particularly, relates to a motor driving control device and a motor driving control method for limiting a current flowing in a motor.

Background

A motor driving control device has been disclosed which is capable of detecting an overcurrent for each rotational frequency of a motor (for example, see Japanese Patent Application Laid-Open No. 2001-086785).

In a control device of a motor disclosed in Japanese Patent Application Laid-Open No. 2001-086785, a voltage value corresponding to a current flowing in the motor is compared with a voltage value stored in storage means to detect an overload and an overcurrent for each rotational frequency of the motor. The storage means stores a voltage value corresponding to a current in an overcurrent state of the motor in advance, the voltage value being obtained for each rotational frequency of the motor and for each type of the motor.

SUMMARY

In a motor driving control device used for a fan motor or the like, for example, an electronic component easily generating heat is cooled by air generated when the fan motor is rotated, to thereby suppress heat generation of the electronic component. For example, the electronic component is disposed at a position easily affected by the air generated along with the rotation of the motor so that the electronic component can be cooled.

However, entry of a foreign matter such as dust into the fan motor may cause a condition of suddenly increasing a motor load and being unable to rotate the motor at a high speed. In such a case, a quantity of the air generated when the fan motor is rotated is reduced resulting that the cooling effect by air cannot be expected with respect to the electronic component. Thus, the electronic component cannot be sufficiently cooled to thereby cause heat generation due to a large load.

The current flowing in the motor is required to be limited to prevent the condition of suddenly increasing the motor load and being unable to rotate the motor at a high speed. On the other hand, a maximum rotational frequency differs depending on the type of the motor, and the magnitude of heat generation with respect to the rotational frequency also differs depending on the type of the motor. Thus, it is not easy to properly set a current limit value in accordance with a rotational speed of the motor for each type of the motor, and it is impossible to generally use a method of detecting an overcurrent for each rotational frequency as in Japanese Patent Application Laid-Open No. 2001-086785.

The present disclosure is related to providing a motor driving control device and a motor driving control method capable of properly limiting a current flowing in a motor in various operation states.

According to a certain aspect of the present disclosure, a motor driving control device includes: a control circuit outputting a driving control signal for driving a motor based on actual rotational frequency information on an actual rotational frequency of a rotor of the motor and speed command information on the rotational frequency of the motor; and a motor driving part outputting, based on the driving control signal output from the control circuit, a driving signal to the motor to drive the motor, the control circuit including: a current detecting part detecting a driving current of the motor; a set duty generating part generating a set duty for outputting the driving control signal based on the speed command information and the actual rotational frequency information; a limit value determining part determining a current limit value based on the set duty and an instructed duty corresponding to the speed command information; and a limiting part limiting the driving current of the motor based on the driving current of the motor detected by the current detecting part and the current limit value determined by the limit value determining part.

Preferably, the limit value determining part determines a first threshold based on the instructed duty, and switchably determines whether the current limit value is to be set to a first current limit value or a second current limit value lower than the first current limit value in response to a result of comparing the set duty and the first threshold.

Preferably, the limit value determining part determines the first threshold based on a value of multiplying the instructed duty by a predetermined first coefficient.

Preferably, the limit value determining part determines the current limit value to be the second current limit value when the set duty continuously exceeds the first threshold for a first predetermined time period.

Preferably, the limit value determining part determines a second threshold smaller than the first threshold based on the instructed duty, and switchably determines whether the current limit value is to be set to the first current limit value or the second current limit value in response to a result of comparing the set duty and the first threshold and a result of comparing the set duty and the second threshold.

Preferably, the limit value determining part determines the second threshold based on a value of multiplying the instructed duty by a predetermined second coefficient.

Preferably, the limit value determining part determines the current limit value to be the first current limit value when the set duty is continuously smaller than the second threshold for a second predetermined time period.

Preferably, the limit value determining part determines the first threshold and the second threshold to be fixed values, respectively when the instructed duty is a predetermined value or less.

Preferably, the limiting part limits the driving current of the motor by switching whether or not the driving control signal is output based on the set duty.

According to another aspect of the present disclosure, in a motor driving control method of driving a motor, the motor includes: a control circuit outputting a driving control signal for driving the motor based on actual rotational frequency information on an actual rotational frequency of a rotor of the motor and speed command information on the rotational frequency of the motor; a motor driving part outputting, based on the driving control signal output from the control circuit, a driving signal to the motor to drive the motor; and a current detecting part detecting a driving current of the motor, and the motor driving control method includes: a set duty generating step of generating a set duty for outputting the driving control signal based on the speed command information and the actual rotational frequency information; a limit value determining step of determining a current limit value based on the set duty and an instructed duty corresponding to the speed command information; and a limiting step of limiting the driving current of the motor based on the driving current of the motor detected by the current detecting step and the current limit value determined by the limit value determining step.

According to these disclosures, a motor driving control device and a motor driving control method can be provided capable of properly limiting a current flowing in a motor in various operation states.

DETAILED DESCRIPTION

Hereinafter, a motor driving control device in embodiments of the present disclosure will be described.
Embodiments FIG. 1 is a block diagram illustrating a circuit configuration of a motor driving control device in one of embodiments of the present disclosure.

Figure 1:
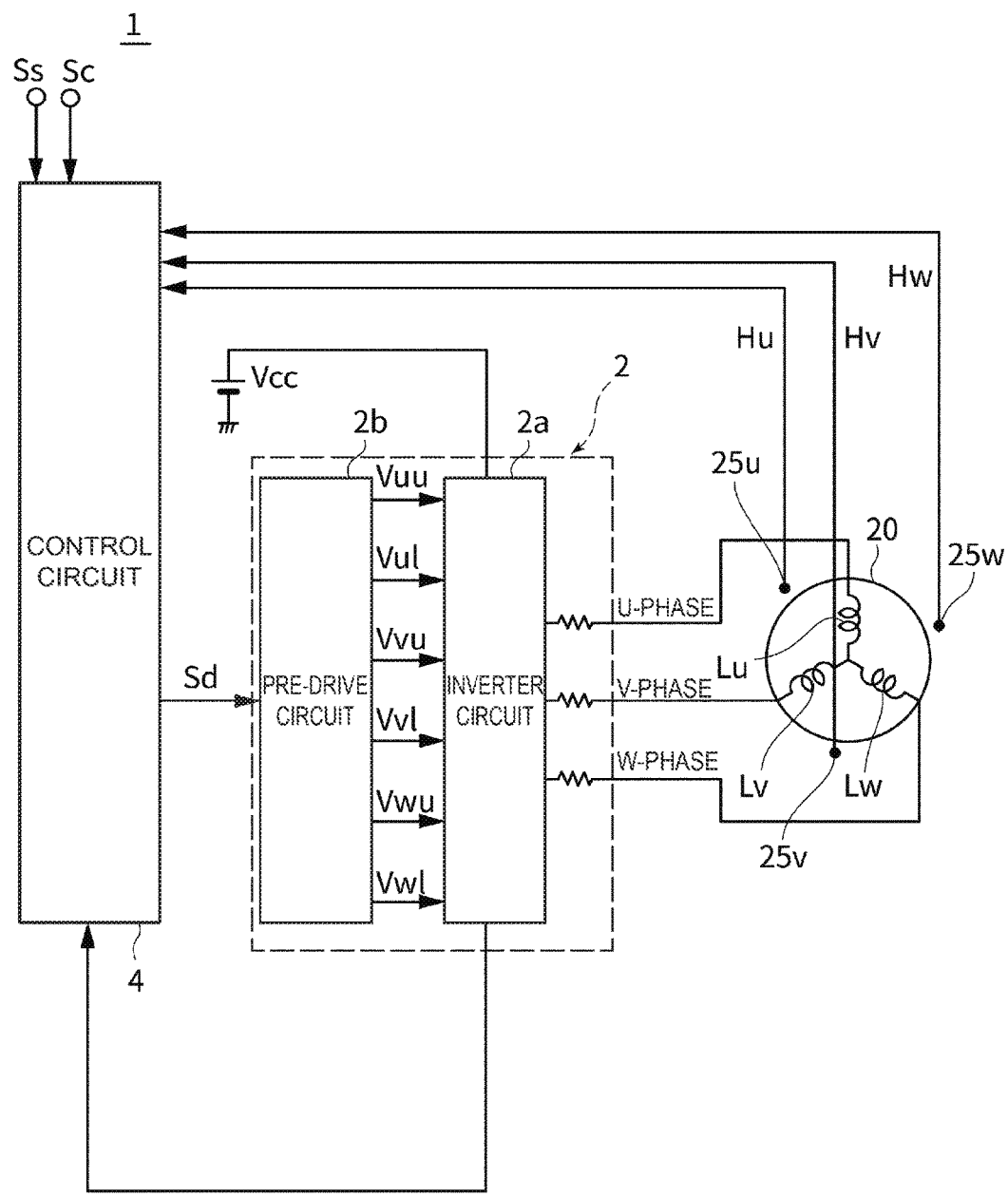
FIG. 1 is a block diagram illustrating a circuit configuration of a motor driving control device in one of embodiments of the present disclosure.

As illustrated in FIG. 1, a motor driving control device 1 drives a motor 20. In the present embodiment, the motor 20 is a three-phase brushless motor, for example. The motor driving control device 1 periodically applies a driving current to armature coils Lu, Lv, Lw of the motor 20 to rotate the motor 20.

The motor driving control device 1 includes a motor driving part 2 and a control circuit 4. Note that some of all components of the motor driving control device 1 are illustrated in FIG. 1, and the motor driving control device 1 may include other components in addition to the components illustrated in FIG. 1.

In the present embodiment, the entire motor driving control device 1 is packaged to form an integrated circuit (IC). Note that part of the motor driving control device 1 may be packaged as one integrated circuit device, or the entire or part of the motor driving control device 1 may be packaged together with another device to form one integrated circuit device.

The motor driving part 2 includes an inverter circuit 2a and a pre-drive circuit 2b. The motor driving part 2 outputs, based on a driving control signal Sd output from the control circuit 4, a driving signal to the motor 20 to drive the motor 20.

The pre-drive circuit 2b generates, based on the control of the control circuit 4, an output signal for driving the inverter circuit 2a to output the signal to the inverter circuit 2a. The inverter circuit 2a outputs, based on the output signal output from the pre-drive circuit 2b, a driving signal to the motor 20 to carry an electric current to armature coils Lu, Lv, Lw included in the motor 20. The inverter circuit 2a is formed so that a pair of two switching elements connected in series to both terminals of a DC power source Vcc are disposed with respect to each phase (U-phase, V-phase, W-phase) of armature coils Lu, Lv, Lw, for example. A contact point between each pair of two switching elements is connected with the corresponding terminal of each phase of the motor 20 (not illustrated). The pre-drive circuit 2b outputs, for example, six types of signals Vuu, Vul, Vvu, Vvl, Vwu, Vwl corresponding to the respective switching elements of the inverter circuit 2a. When these output signals are output, the switching element corresponding to each output signal performs an on/off operation so that the driving signal is output to the motor 20 to supply electric power to each phase of the motor 20 (not illustrated).

In the present embodiment, a speed command signal (an example of speed command information) Sc and a start signal Ss are input to the control circuit 4. The control circuit 4 performs a driving control of the motor 20 based on the input signals.

The speed command signal Sc is input from the outside of the control circuit 4, for example. The speed command signal Sc is a signal relating to the rotational speed of the motor 20. For example, the speed command signal Sc is a PWM (Pulse Width Modulation) signal corresponding to a target rotational speed of the motor 20. In other words, the speed command signal Sc is information corresponding to a target value of the rotational speed of the motor 20. Note that a clock signal may be input as the speed command signal Sc.

The start signal Ss is input from the outside of the control circuit 4, for example. The start signal Ss is a signal for setting whether to perform the driving control of the motor 20 or to set the motor 20 in a standby state without performing the driving control of the motor 20.

In the present embodiment, three hall signals (exemplary position detecting signals) Hu, Hv, Hw are input to the control circuit 4 from the motor 20. The hall signals Hu, Hv, Hw are output from three hall (HALL) elements 25u, 25v, 25w disposed in the motor 20, for example. The hall signals Hu, Hv, Hw are signals corresponding to the rotation of the rotor of the motor 20. The control circuit 4 detects a rotation state of the motor 20 using the hall signals Hu, Hv, Hw, to control the drive of the motor 20. That is, the control circuit 4 obtains actual rotational frequency information on an actual rotational frequency of the rotor of the motor 20 using the hall signals Hu, Hv, Hw, to control the drive of the motor 20. The control circuit 4 detects a rotational position of the rotor of the motor 20 using the hall signals Hu, Hv, Hw, to control the drive of the motor 20.

The three hall elements 25u, 25v, 25w (hereinafter sometimes collectively referred to as a hall element 25) are disposed around the rotor of the motor 20 at substantially equal intervals one from another (at an interval of 120° between adjacent hall elements). Each of the hall elements 25u, 25v, 25w detects a magnetic pole of the rotor and outputs the corresponding hall signal Hu, Hv, Hw.

Note that in addition to such hall signals Hu, Hv, Hw, another information on the rotation state of the motor 20 may be input to the control circuit 4. For example, a signal (pattern FG) generated using a coil pattern provided on a substrate on a rotor side may be input to the control circuit 4 as an FG signal corresponding to the rotation of the rotor of the motor 20. The rotation state of the motor 20 may be detected based on a detection result of a rotational position detecting circuit for detecting a counter electromotive voltage induced in each phase (U-phase, V-phase, W-phase) of the motor 20. An encoder or a resolver may be provided to detect the information on the rotational speed and the like of the motor 20.

The control circuit 4 comprises, for example, a microcomputer, a digital circuit, and the like. The control circuit 4 outputs the driving control signal Sd for driving the motor 20 based on the actual rotational frequency information and the speed command signal Sc. Specifically, the control circuit 4 outputs the driving control signal Sd to the pre-drive circuit 2b based on the hall signals Hu, Hv, Hw, the speed command signal Sc, and the start signal Ss. The control circuit 4 outputs the driving control signal Sd and performs the rotation control of the motor 20 so that the motor 20 rotates at a rotational frequency corresponding to the speed command signal Sc. That is, the control circuit 4 outputs the driving control signal Sd for driving the motor 20 to the motor driving part 2 to perform the rotation control of the motor 20. The motor driving part 2 outputs, based on the driving control signal Sd, the driving signal to the motor 20 to drive the motor 20.

[Description of Control Circuit 4]

Figure 2:
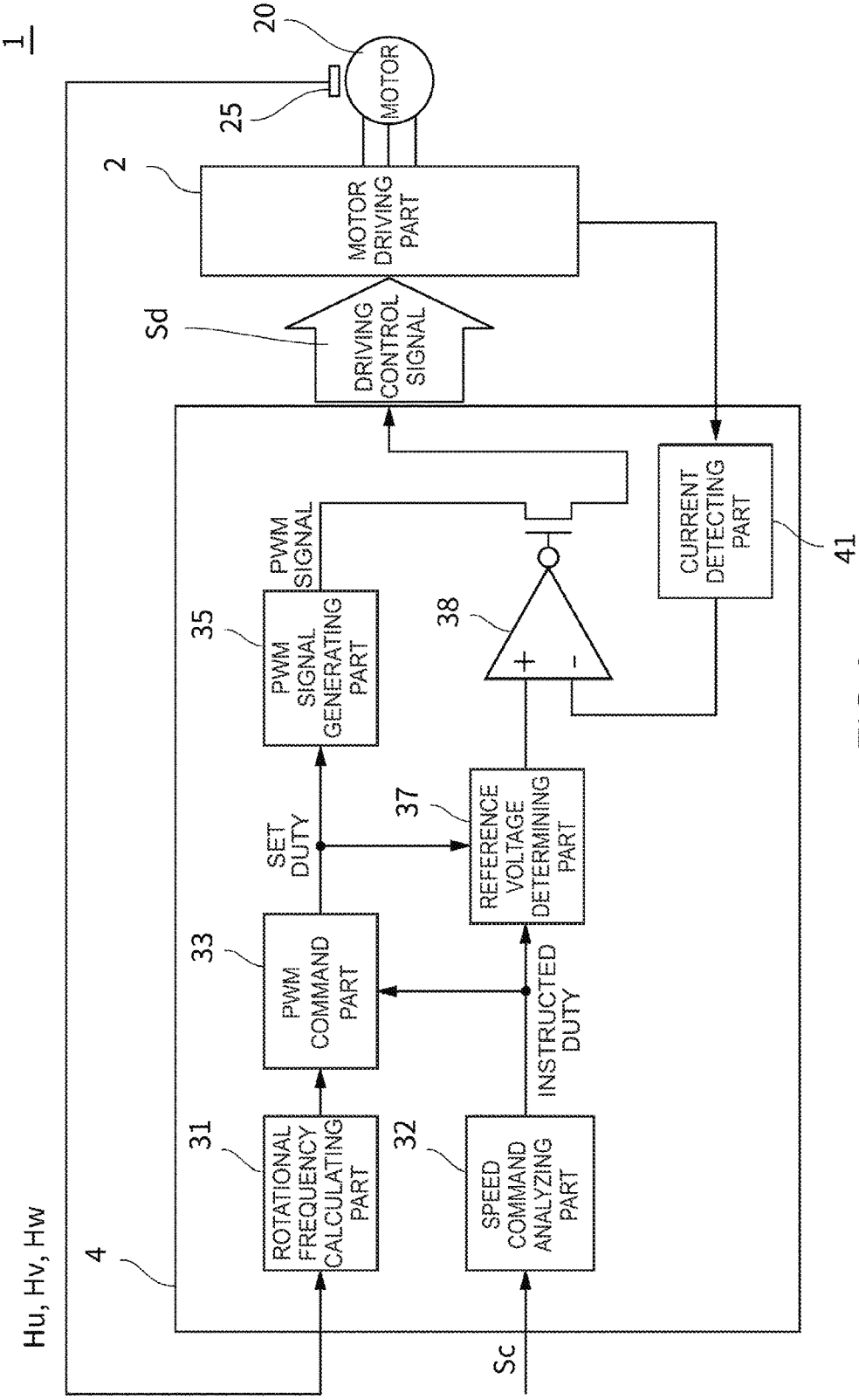
FIG. 2 is a block diagram illustrating a configuration of a control circuit.

FIG. 2 is a block diagram illustrating a configuration of the control circuit 4.

As described later, the control circuit 4 includes a current detecting part 41 detecting a driving current of the motor 20, a set duty generating part generating a set duty for outputting the driving control signal Sd based on the speed command signal (exemplary speed command information) Sc and the actual rotational frequency information, a reference voltage determining part (exemplary limit value determining part) 37 determining a current limit value based on the set duty and an instructed duty corresponding to the speed command signal Sc, and a comparator (exemplary limiting part) 38 limiting the driving current of the motor 20 based on the driving current of the motor 20 detected by the current detecting part 41 and the current limit value determined by the reference voltage determining part 37. That is, as illustrated in FIG. 2, the control circuit 4 includes a rotational frequency calculating part (part of the set duty generating part) 31, a speed command analyzing part (part of the set duty generating part) 32, a PWM command part (part of the set duty generating part) 33, a PWM signal generating part 35, the reference voltage determining part 37, the comparator 38, and the current detecting part 41.

The current detecting part 41 detects the driving current of the motor 20. The current detecting part 41 detects a current flowing from the motor driving part 2 to the motor 20. The current detecting part 41 has a current detecting resistance disposed between the inverter circuit 2a and ground (GND), for example. For example, the current flowed to the motor 20 passes through the inverter circuit 2a and then through the current detecting resistance to ground (GND). The current detecting part 41 can detect the current flowing to the motor 20 based on a voltage between both ends of the current detecting resistance. Then, the current detecting part 41 detects the driving current flowing in the motor 20 as a voltage. The voltage being a detection result of the current detecting part 41 is input to the comparator 38.

The hall signals Hu, Hv, Hw are input to the rotational frequency calculating part 31. The rotational frequency calculating part 31 generates and outputs a position signal indicating a positional relation between each phase and the rotor and the actual rotational frequency information corresponding to a cycle of the position signal based on the input hall signals Hu, Hv, Hw. That is, the rotational frequency calculating part 31 outputs the actual rotational frequency information on an actual rotational frequency of the rotor of the motor 20.

The speed command signal Sc is input to the speed command analyzing part 32. The speed command analyzing part 32 outputs the instructed duty indicating a duty value of a PWM signal corresponding to the target rotational frequency of the motor 20. The instructed duty means the information indicating the duty ratio corresponding to the speed command signal Sc. The instructed duty is output to the PWM command part 33 and the reference voltage determining part 37.

The position signal and the actual rotational frequency information output from the rotational frequency calculating part 31, and the instructed duty corresponding to the speed command signal Sc output from the speed command analyzing part 32 are input to the PWM command part 33. The PWM command part 33 outputs the set duty based on the position signal and the actual rotational frequency information, and the instructed duty. The set duty means the information indicating the duty ratio for outputting the driving control signal Sd. The set duty is output to the PWM signal generating part 35 and the reference voltage determining part 37.

The PWM command part 33 generates the set duty for outputting the driving control signal Sd based on the speed command information and the actual rotational frequency information. For example, the PWM command part 33 compares the instructed duty corresponding to the speed command signal Sc and the actual rotational frequency information corresponding to the rotational frequency of the motor 20, and generates the set duty so that the rotational speed of the motor 20 corresponds to the instructed duty (set duty generating step).

The set duty is input to the PWM signal generating part 35. The PWM signal generating part 35 generates the PWM signal for driving the motor driving part 2 based on the set duty. The PWM signal is, for example, a signal having a duty ratio equal to the set duty. In other words, the PWM signal is a signal having the duty ratio corresponding to the set duty.

When the motor driving control device 1 and the motor 20 are driven in a normal operation state, the PWM signal output from the PWM signal generating part 35 is output from the control circuit 4 to the motor driving part 2 as the driving control signal Sd. Then, the driving signal is output from the motor driving part 2 to the motor 20, and then the motor 20 is driven.

The instructed duty and the set duty are input to the reference voltage determining part 37. The reference voltage determining part 37 determines the current limit value based on the set duty and the instructed duty corresponding to the speed command signal Sc (limit value determining step). The current limit value is, for example, a voltage value. The current limit value is output from the reference voltage determining part 37, and input to the comparator 38.

The comparator 38 limits the driving current of the motor 20 based on the driving current of the motor 20 detected by the current detecting part 41 and the current limit value determined by the reference voltage determining part 37. That is, the voltage value being the current limit value (hereinafter sometimes referred to as a limit value) and the voltage value being the detection result of the current detecting part 41 (hereinafter sometimes referred to as a detected voltage value) are input to the comparator 38. The comparator 38 compares the detected voltage value and the limit value. The comparator 38 switches whether or not the PWM signal generated by the PWM signal generating part 35 is output as the driving control signal Sd in response to the comparison result. The comparator 38 switches whether or not the driving control signal Sd is output based on the set duty. The comparator 38 performs the switching by outputting a signal for triggering automatic shut-down of the PWM signal.

When the detected voltage value is smaller than the limit value, that is, the magnitude of the current flowing in the motor 20 is smaller than the current limit value, the PWM signal generated by the PWM signal generating part 35 is output as the driving control signal Sd.

On the other hand, when the detected voltage value is larger than the limit value, that is, the magnitude of the current flowing in the motor 20 is larger than the current limit value, an output path of the PWM signal output from the PWM signal generating part 35 is cut off by the comparator 38, so that the PWM signal is not contained in the driving control signal Sd. In other words, when the magnitude of the current flowing in the motor 20 is larger than the current limit value, the normal output of the driving control signal Sd is cut off. Then, the driving current of the motor 20 is limited.

Thus, the comparator 38 functions as a limiting part limiting the driving current of the motor 20 based on the driving current of the motor 20 and the current limit value determined by the reference voltage determining part 37 (limiting step). The comparator 38 switches whether or not the driving control signal Sd is output based on the set duty (whether or not the PWM signal generated by the PWM signal generating part 35 is output as the driving control signal Sd), to limit the driving current of the motor 20. Then, the overcurrent state where the driving current of the motor 20 becomes excessive is prevented from being sustained.

[Description of Determination of Current Limit Value]

As described below, the reference voltage determining part 37 determines a first threshold based on the instructed duty, and switchably determines whether the current limit value is to be set to a first current limit value or a second current limit value lower than the first current limit value in response to a result of comparing the set duty and the first threshold. The reference voltage determining part 37 determines a second threshold smaller than the first threshold based on the instructed duty, and switchably determines whether the current limit value is to be set to the first current limit value or the second current limit value in response to a result of comparing the set duty and the first threshold and a result of comparing the set duty and the second threshold. That is, the reference voltage determining part 37 determines the current limit value based on the instructed duty and the set duty as follows. The current limit value is set to either a first current limit value Ia or a second current limit value Ib lower than the first current limit value Ia. The reference voltage determining part 37 switchably determines whether the current limit value output to the comparator 38 is to be set to the first current limit value Ia or the second current limit value Ib as follows.

In the present embodiment, the switching between the first current limit value Ia and the second current limit value Ib is performed based on the set duty and the two thresholds relating to the set duty (first threshold (threshold 1), second threshold (threshold 2)). That is, the reference voltage determining part 37 switchably determines whether the current limit value is to be set to the first current limit value Ia or the second current limit value Ib in response to a result of comparing the set duty and the first threshold and a result of comparing the set duty and the second threshold.

Note that the second current limit value Ib is set to a voltage value of half the first current limit value Ia, for example. The magnitude relation between the first current limit value Ia and the second current limit value Ib is not limited to the above-described relation, and the magnitudes of the first current limit value Ia and the second current limit value Ib may be appropriately set. The magnitude of the first current limit value Ia is set to prevent each component of the motor driving control device 1 and the motor 20 from being damaged at least for a predetermined time period, even when the driving current of the motor 20 becomes the first current limit value Ia.

The reference voltage determining part 37 determines the first threshold based on the instructed duty. The reference voltage determining part 37 determines the second threshold smaller than the first threshold based on the instructed duty. Specifically, the reference voltage determining part 37 determines the first threshold based on a value of multiplying the instructed duty by a predetermined first coefficient, for example. The reference voltage determining part 37 determines the second threshold based on a value of multiplying the instructed duty by a predetermined second coefficient.

Figure 3:
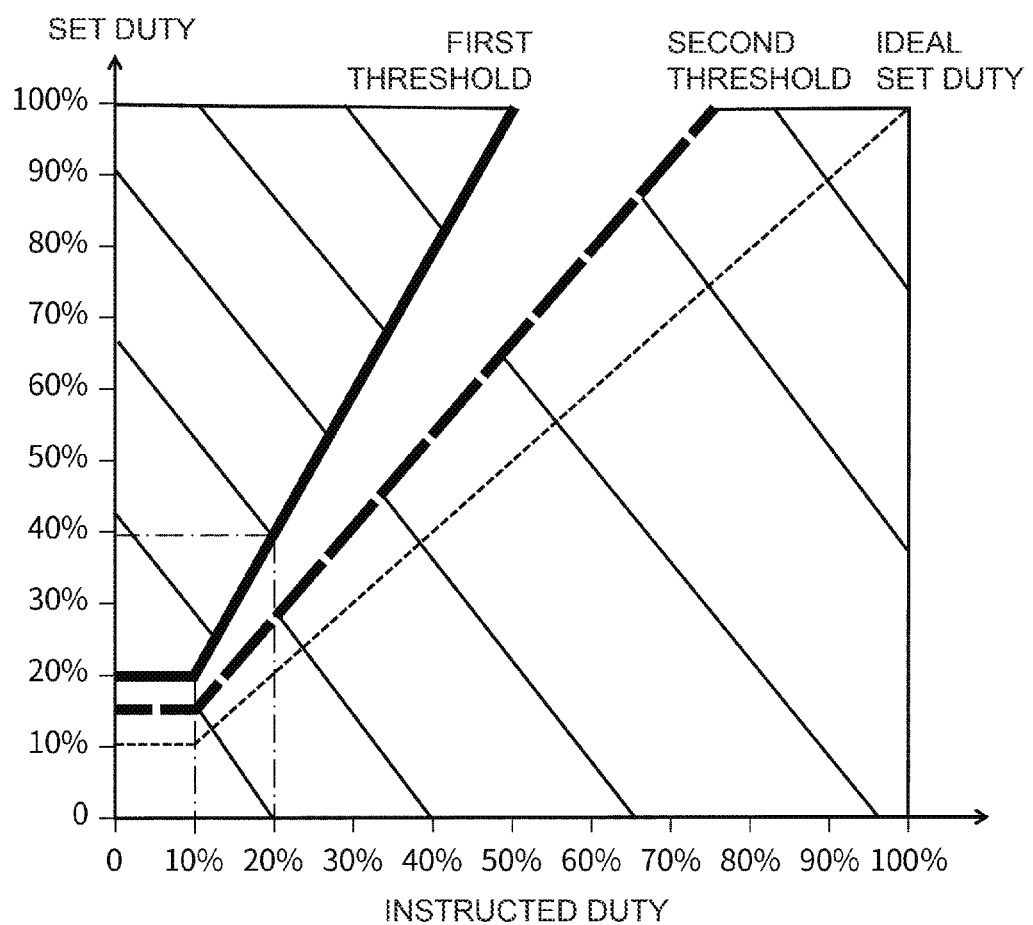
FIG. 3 is a graph showing an exemplary relation between an instructed duty and a threshold.

FIG. 3 is a graph showing an exemplary relation between the instructed duty and the threshold.

In FIG. 3, the abscissa of the graph represents the instructed duty, and the ordinate represents the set duty. The first threshold is shown by a thick solid line, and the second threshold is shown by a thick broken line. A thin broken line shows a relation between the instructed duty and the set duty (ideal set duty) when the motor 20 is driven in an ideal state (for example, a state where the motor 20 is smoothly rotated with less load).

When the instructed duty is a predetermined value (for example, 10 percent) or more as described above, each of the first threshold and the second threshold is proportional to the instructed duty. Since the first coefficient is larger than the second coefficient, the first threshold is larger than the second threshold.

Note that the second coefficient is set so that the second threshold includes a certain degree of margin with respect to an ideal set duty.

As shown in FIG. 3, at the same instructed duty, a difference between the first threshold and the second threshold corresponds to a value of multiplying a value of subtracting the second coefficient from the first coefficient by the instructed duty. That is, for switching between the first current limit value Ia and the second current limit value Ib as described below in detail, hysteresis is provided between the first threshold and the second threshold.

Note that the reference voltage determining part 37 determines each of the first threshold and the second threshold to be a fixed value when the instructed duty is a predetermined value or less. Specifically, as shown in FIG. 3, when the instructed duty is 10 percent or less, for example, the first threshold is uniformly determined to be a value of multiplying 10 percent (a value of the instructed duty) by the first coefficient. The second threshold is uniformly determined to be a value of multiplying 10 percent (a value of the instructed duty) by the second coefficient.

When the instructed duty is thus 10 percent or less, for example, each of the first threshold and the second threshold is determined to be a fixed value, and thereby the difference between the first threshold and the second threshold is kept fixed. Accordingly, even when the instructed duty is low, hysteresis between the first threshold and the second threshold can be surely maintained for switching between the first current limit value Ia and the second current limit value Ib.

The switching between the first current limit value Ia and the second current limit value Ib is performed based on the relation between the set duty and the first threshold and the relation between the set duty and the second threshold. That is, when the set duty is in a region above a line of the first threshold in FIG. 3 (for example, when the instructed duty is 20 percent, the set duty is 50 percent), it can be considered that the set duty is abnormal. In such a state, the current limit value is lowered from the first current limit value Ia to the second current limit value Ib to thereby suppress the current flowing in the motor 20. When the set duty is in a region below a line of the second threshold in FIG. 3, it can be considered that the set duty is within the allowable range. That is, it can be considered that the abnormality caused by overcurrent does not occur in the motor 20 and the motor driving control device 1. In such a case, if the current limit value is the second current limit value Ib lower than the original value, the current limit value is increased to the first current limit value Ia so that the motor 20 can be driven as usual.

Note that in the present embodiment, when the set duty continuously exceeds the first threshold for a first predetermined time period in the case of determining the current limit value to be the first current limit value Ia, the reference voltage determining part 37 determines the current limit value to be the second current limit value Ib. When the set duty is continuously smaller than the second threshold for a second predetermined time period in the case of determining the current limit value to be the second current limit value Ib, the reference voltage determining part 37 determines the current limit value to be the first current limit value Ia. The first predetermined time period and the second predetermined time period can be appropriately set. The first predetermined time period and the second predetermined time period may be the same.

Thus, since the switching between the first current limit value Ia and the second current limit value Ib is performed on the condition that the predetermined state is continued for the predetermined time period, the switching of the current limit value is not performed even if the set duty temporarily crosses over the threshold. Accordingly, the current limit value is stabilized, and thereby the motor 20 can be stably driven.

Specifically, the operation of determining the current limit value is performed as follows, for example.

Figure 4:
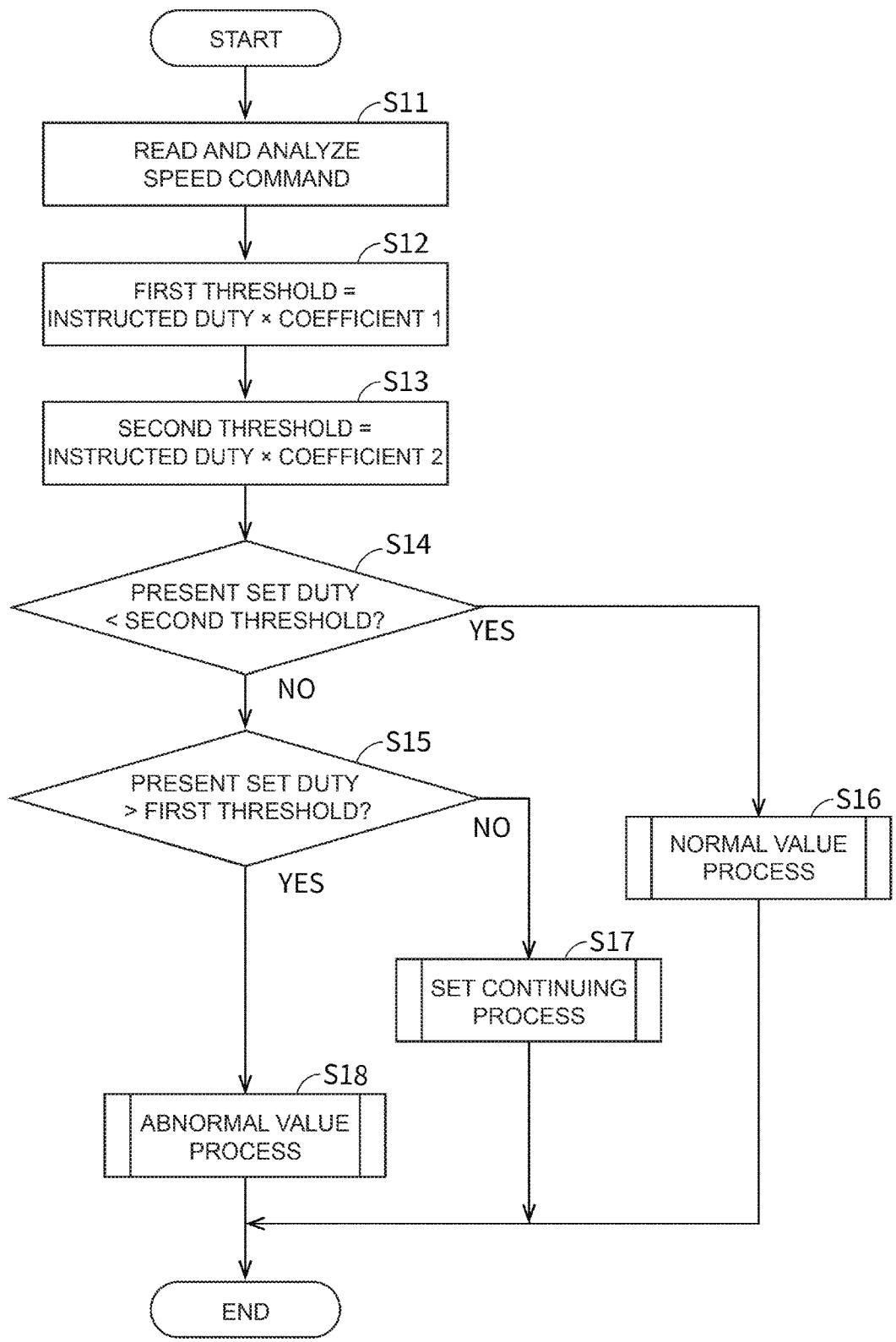
FIG. 4 is a flowchart illustrating an operation of determining a current limit value of the control circuit.

FIG. 4 is a flowchart illustrating the operation of determining the current limit value of the control circuit 4.

In the control circuit 4, the current limit value is determined by repeating processes illustrated in FIG. 4.

As illustrated in FIG. 4, in Step S11, the speed command analyzing part 32 reads and analyzes the speed command signal Sc. Then, the instructed duty (ideal set duty) is obtained in accordance with the speed command signal Sc.

In Step S12, the reference voltage determining part 37 calculates and obtains the first threshold. In the present embodiment, the product of the instructed duty and the first coefficient (coefficient 1) is obtained as the first threshold. Note that the calculation method of the first threshold is not limited to the above-described calculation method.

In Step S13, the reference voltage determining part 37 calculates and obtains the second threshold. In the present embodiment, the product of the instructed duty and the second coefficient (coefficient 2) is obtained as the second threshold. Note that the calculation method of the second threshold is not limited to the above-described calculation method.

In Step S14, the reference voltage determining part 37 compares a present set duty and the second threshold. The reference voltage determining part 37 determines whether the set duty is smaller than the second threshold. When the set duty is not smaller than the second threshold (if NO), the step proceeds to Step S15. When the set duty is smaller than the second threshold (if YES), the step proceeds to Step S16.

In Step S15, the reference voltage determining part 37 compares the present set duty and the first threshold. The reference voltage determining part 37 determines whether the set duty is larger than the first threshold. When the set duty is not larger than the first threshold (if NO), the step proceeds to Step S17. When the set duty is larger than the first threshold (if YES), the step proceeds to Step S18.

In Step S16, the reference voltage determining part 37 performs a normal value process. That is, when the present set duty is smaller than the second threshold (when the set duty is in a region below the line of the second threshold in FIG. 3), it can be considered that any trouble is not caused in operation of the motor 20. At this time, the normal value process is performed. The normal value process will be described later.

In Step S17, the reference voltage determining part 37 performs a set continuing process. That is, when the present set duty is larger than the second threshold but does not exceed the first threshold (when the set duty is in a region between the line of the second threshold and the line of the first threshold in FIG. 3), it can be considered that the driving current is relatively high, but is not in the overcurrent state requiring to lower the driving current. At this time, the set continuing process is performed to maintain the control state at the present current limit value. The set continuing process will be described later.

In Step S18, the reference voltage determining part 37 performs an abnormal value process. That is, when the present set duty is larger than the first threshold, the driving current is in the overcurrent state, and it can be considered that the driving current is required to be lowered if the overcurrent state continues. At this time, the abnormal value process is performed. The abnormal value process will be described later.

Figure 5:
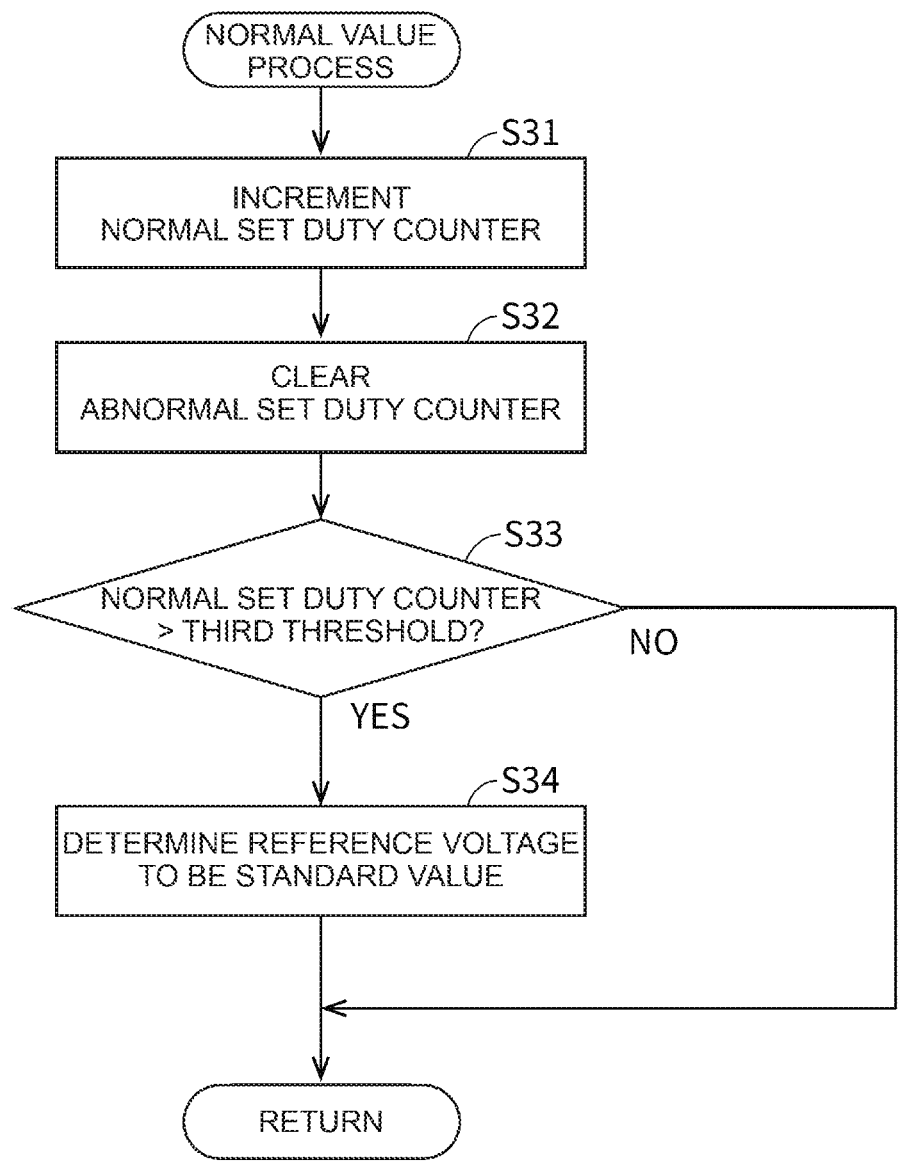
FIG. 5 is a flowchart illustrating a normal value process.

FIG. 5 is a flowchart illustrating the normal value process.

When determining that the present set duty is smaller than the second threshold, the reference voltage determining part 37 starts the normal value process.

In Step S31, the reference voltage determining part 37 increments a normal set duty counter.

In Step S32, the reference voltage determining part 37 clears an abnormal set duty counter.

In Step S33, the reference voltage determining part 37 determines whether count values of the normal set duty counter are larger than a third threshold. When the count values are not larger than the third threshold (if NO), the normal value process is finished, and the processes in FIG. 4 are performed again. When the count values are larger than the third threshold (if YES), the process proceeds to step S34.

In Step S34, the reference voltage determining part 37 determines the voltage value (reference voltage) of the current limit value to be a standard value. In the present embodiment, the standard value is the first current limit value Ia. When the present current limit value (previously determined current limit value) is the first current limit value Ia, the current limit value is continuously determined to be the first current limit value Ia. On the other hand, when the present current limit value is the second current limit value Ib, the current limit value is determined to be the first current limit value Ia to become in the normal control state. Then, the normal value process is finished, and the processes in FIG. 4 are performed again.

Figure 6:
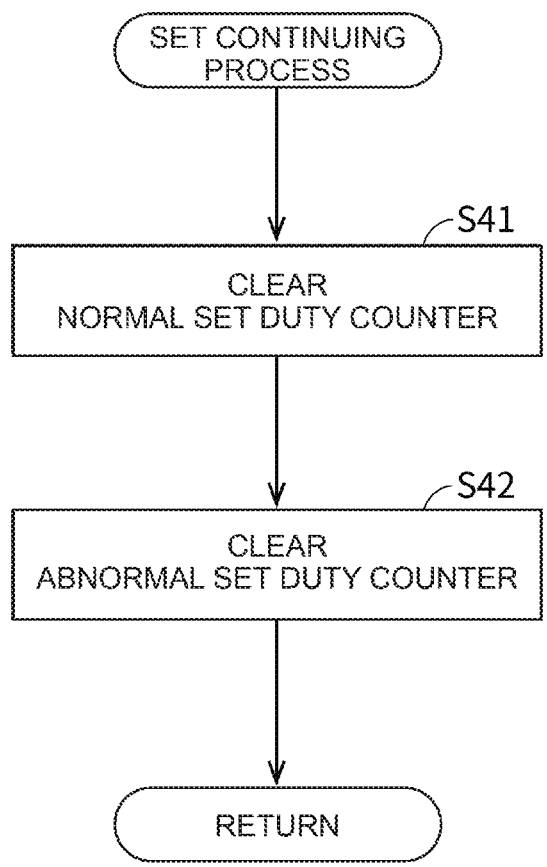
FIG. 6 is a flowchart illustrating a set continuing process.

FIG. 6 is a flowchart illustrating a set continuing process.

When determining that the present set duty is larger than the second threshold but does not exceed the first threshold, the reference voltage determining part 37 starts the set continuing process.

In Step S41, the reference voltage determining part 37 clears the normal set duty counter.

In Step S42, the reference voltage determining part 37 clears the abnormal set duty counter. Then the set continuing process is finished, and the processes in FIG. 4 are performed again.

Thus, in the set continuing process, the current limit value is not determined, the current limit value determined in the normal value process or the abnormal value process is maintained, the current limit value being the first current limit value Ia or the second current limit value Ib.

Figure 7:
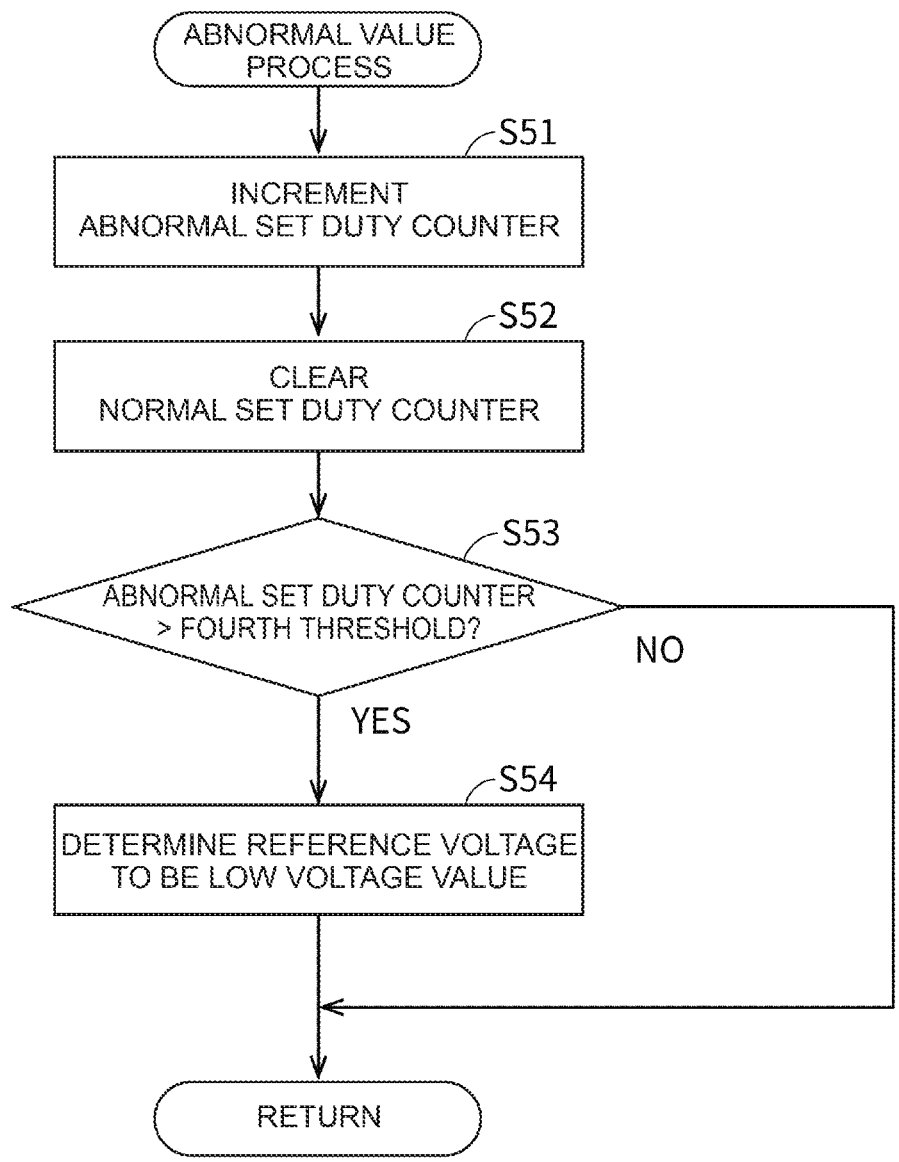
FIG. 7 is a flowchart illustrating an abnormal value process.

FIG. 7 is a flowchart illustrating the abnormal value process.

When determining that the present set duty is larger than the first threshold, the reference voltage determining part 37 starts the abnormal value process.

In Step S51, the reference voltage determining part 37 increments the abnormal set duty counter.

In Step S52, the reference voltage determining part 37 clears the normal set duty counter.

In Step S53, the reference voltage determining part 37 determines whether a counter value of the abnormal set duty counter is larger than a fourth threshold. When the count values are not larger than the fourth threshold (if NO), the abnormal value process is finished, and the processes in FIG. 4 are performed again. When the count values are larger than the fourth threshold (if YES), the process proceeds to step S54.

In Step S54, the reference voltage determining part 37 determines the voltage value (reference voltage) of the current limit value to be a low voltage value. In the present embodiment, the low voltage value is the second current limit value Ib. When the present current limit value (previously determined current limit value) is the second current limit value Ib, the current limit value is continuously determined to be the second current limit value Ib. On the other hand, when the present current limit value is the first current limit value Ia, the current limit value is determined to be the second current limit value Ib to become in the control state performing the current limit more severely than the normal current limit. Then, the abnormal value process is finished, and the processes in FIG. 4 are performed again.

Thus, the normal value process, the abnormal value process or the set continuing process is performed in response to the relation between the set duty and the first threshold and the relation between the set duty and the second threshold. Then, in the cases described below, for example, the reference voltage determining part 37 switchably determines whether the current limit value is to be set to the first current limit value Ia or the second current limit value Ib.

When the set duty is continuously smaller than the second threshold, the processes in FIG. 4 are repeatedly performed, the normal value process is repeated, and therefore the count values of the normal set duty counter are sequentially incremented. When the count values of the normal set duty counter exceed the third threshold, the current limit value is determined to be the first current limit value Ia. That is, when the set duty is continuously smaller than the second threshold for a time period longer than the time period (exemplary second predetermined time period) corresponding to the count values of the third threshold, the reference voltage determining part 37 determines the current limit value to be the first current limit value Ia. When the set duty is larger than the second threshold before the count values of the normal set duty counter exceed the third threshold, the count values of the normal set duty counter are cleared in the abnormal value process or the set continuing process. Thus, when the set duty is smaller than the second threshold next, the normal set duty counter is counted from zero.

When the set duty is continuously larger than the first threshold, the processes in FIG. 4 are repeatedly performed, the abnormal value process is repeated, and therefore the count values of the abnormal set duty counter are sequentially incremented. When the count values of the abnormal set duty counter exceed the fourth threshold, the current limit value is determined to be the second current limit value Ib. That is, when the set duty is continuously larger than the first threshold for a time period longer than the time period (exemplary first predetermined time period) corresponding to the count values of the fourth threshold, the reference voltage determining part 37 determines the current limit value to be the second current limit value Ib. When the set duty is smaller than the first threshold before the count values of the abnormal set duty counter exceed the fourth threshold, the count values of the abnormal set duty counter are cleared in the normal value process or the set continuing process. Thus, when the set duty is larger than the first threshold next, the abnormal set duty counter is counted from zero.

The third threshold is set corresponding to a time period longer than a time period capable of determining that the driving current is in the normal state and the motor 20 is stably driven. The fourth threshold is set corresponding to a time period longer than a time period capable of determining that the overcurrent state stably continues and shorter than a time period capable of determining that the temperature rise of the motor 20 and the like caused by the continuous overcurrent state is within an allowable range. Such a time period can be set based on a result of an experiment, for example. The third threshold and the fourth threshold may be different from each other or the same.

Note that the third threshold and the fourth threshold are set in combination with the cycle of the control operation illustrated in FIG. 4. For example, if the control operation illustrated in FIG. 4 is performed every five milliseconds, and the third threshold and the fourth threshold are set to 1000, the current limit value is determined when the normal set duty counter or the abnormal set duty counter continuously counts for five seconds. That is, the current limit value is changed when the current limit value is the first current limit value Ia, and the set duty is continuously larger than the first threshold for five seconds, or when the current limit value is the second current limit value Ib, and the set duty is continuously smaller than the second threshold for five seconds.

Figure 8:
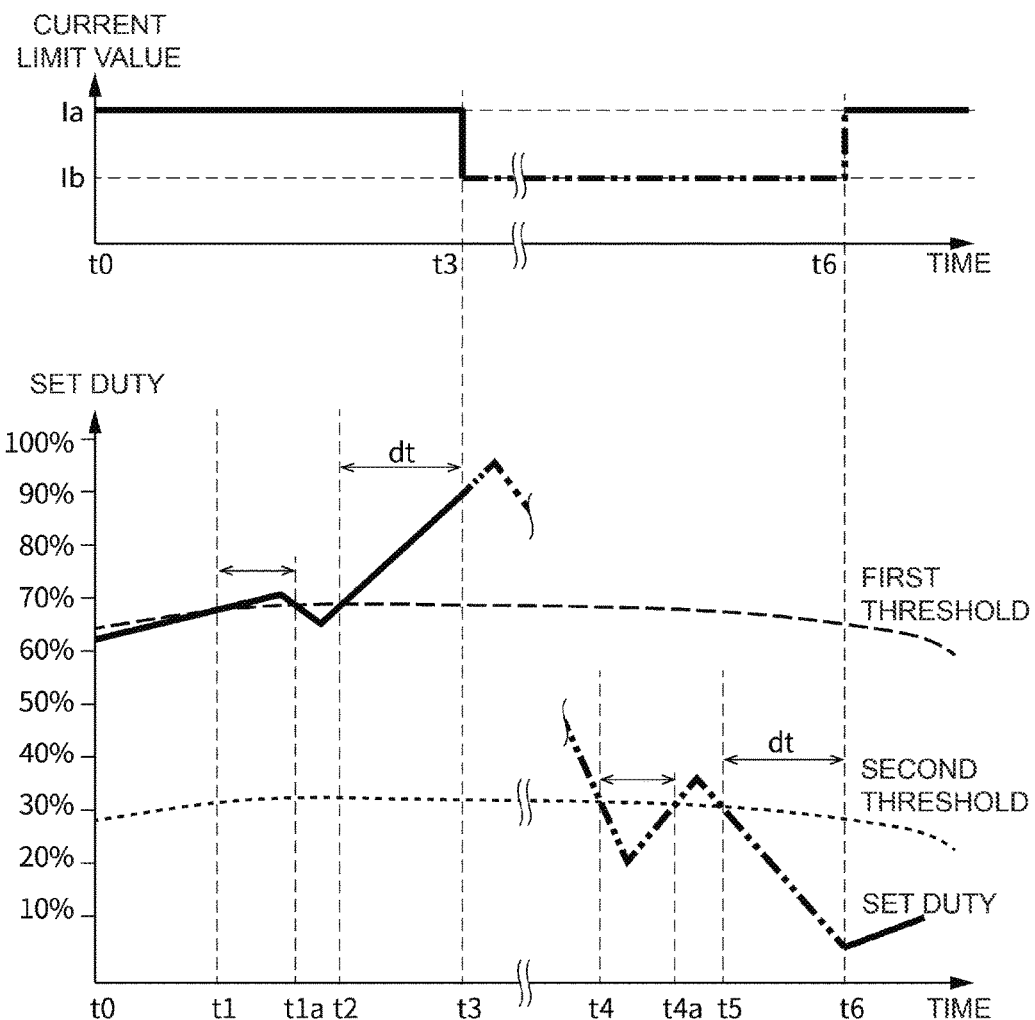
FIG. 8 is a timing chart describing an exemplary operation of a motor driving control device.

FIG. 8 is a timing chart describing an exemplary operation of the motor driving control device 1.

In FIG. 8, an upper part illustrates an exemplary transition of the current limit value, and a lower part illustrates an exemplary transition of the set duty. In the lower part, the first threshold is indicated by a broken line, and the second threshold is indicated by a dotted line. FIG. 8 illustrates curves of the first threshold and the second threshold respectively varying in accordance with the instructed duty (not illustrated) gently changing with the lapse of time. In the example illustrated in FIG. 8, the third threshold and the fourth threshold are set to the same value, and the time period corresponding to the third threshold and the fourth threshold is indicated by a predetermined time period dt (exemplary first predetermined time period, exemplary second predetermined time period).

At a time to, the current limit value is determined to be the first current limit value Ia, and the set duty is about 60 percent. Since the load of the motor 20 is increased, the set duty is increased, and the set duty becomes larger than the first threshold at a time t1. Thus, the increment of the abnormal set duty counter is started. Then, the set duty becomes smaller than the first threshold at a time t1a before the predetermined time period dt elapses from the time t1. Thus, the determination of the current limit value by the abnormal value process is not performed, and the abnormal set duty counter is reset.

When at a time t2, the set duty becomes larger than the first threshold again, the increment of the abnormal set duty counter is started from zero. That is, clocking of the predetermined time period dt is started. Since the set duty is continuously larger than the first threshold for the predetermined time period dt from the time t2 to a time t3, the current limit value is determined to be the second current limit value Ib by the abnormal value process at the time t3. That is, the current limit value is decreased from the first current limit value Ia to the second current limit value Ib. In FIG. 8, a two-dot chain line indicates that the current limit value is determined to be the second current limit value Ib.

When at the time t3, the current limit value is decreased to the second current limit value Ib, the PWM signal based on the set duty is not output as the driving control signal Sd if the driving current exceeds the current value corresponding to the second current limit value Ib. Therefore, the driving current is reduced to thereby suppress the heat generation of the motor 20.

Then, when the current limit value is the second current limit value Ib, the set duty approaches the instructed duty as the load is reduced, and the normal value process is performed if the set duty is smaller than the second threshold.

That is, at a time t4, the set duty becomes smaller than the second threshold. Thus, the increment of the normal set duty counter is started. Then, the set duty becomes larger than the second threshold at a time t4a before the predetermined time period dt elapses from the time t4. Thus, the determination of the current limit value by the normal value process is not performed, and the normal set duty counter is reset.

When at a time t5, the set duty becomes smaller than the second threshold again, the increment of the normal set duty counter is started from zero. That is, clocking of the predetermined time period dt is started. Since the set duty is continuously smaller than the second threshold for the predetermined time period dt from the time t5 to a time t6, the current limit value is determined to be the first current limit value Ia by the normal value process at the time t6. That is, the current limit value is returned to the first current limit value Ia from the second current limit value Ib.

Thus, in the present embodiment, the current limit value is determined based on the set duty and the instructed duty based on the speed command signal Sc. Accordingly, in multiple motors of different types, e.g., motors having different maximum rotational frequency, the current limit values suitable for the respective motors can be determined. For example, ranges of driving current may vary depending on the type of the motor. In such a case, the resistance values used in the current detecting part 41 may be appropriately set so that the voltage value is output from the current detecting part 41, the voltage value conforming to the current limit value determined by the reference voltage determining part 37. Accordingly, the motor driving control device can be provided having versatility and being inexpensive in manufacturing cost.

The current limit value is determined in response to a result of comparing the set duty and the first threshold or the second threshold based on the instructed duty. Accordingly, the overcurrent state can be properly prevented from being continued at any rotational frequency, to thereby suppress the temperature increase of the motor. When the motor is stably driven in not the overcurrent state but the normal state after the current limit value is set to a low voltage value, the current limit value is returned to the standard value, and the motor 20 can be continuously driven in the normal driving state if there is no factor of occurrence of the overcurrent state. That is, the motor driving control device and the motor driving control method can be provided capable of properly limiting the current flowing in the motor in the various operation states.

[Others]

The motor driving control device is not limited to the circuit configurations described in the above-described embodiments and the modifications. Various circuit configurations configured to achieve the object of the present disclosure can be applied.

Each of the first threshold and the second threshold is not limited to a value of multiplying the instructed duty by a coefficient. For example, each of the first threshold and the second threshold may be a value of multiplying a value based on the instructed duty such as the square of the instructed duty by a coefficient. Alternatively, each of the first threshold and the second threshold may be a value obtained by adding a duty ratio previously obtained in accordance with the magnitude of the instructed duty to the value based on the instructed duty.

The reference voltage determining part may determine the current limit value only using the first threshold. For example, when the set duty becomes larger than the first threshold, the reference voltage determining part may determine the current limit value to be the second current limit value so that the motor may be driven at the current limit value of the second current limit value as long as the motor is continuously driven. After the current limit value is determined to be the second current limit value, e.g., after the elapse of the predetermined time period, the current limit value may be returned to the first current limit value. Even if such a configuration is applied, the temperature increase of the motor can be suppressed similarly.

In components of the motor driving control device, at least a part of the components may be processed not by hardware but by software.

The motor driven by the motor driving control device in the present embodiment is not limited to a three-phase brushless motor, and may be other type of motor. The number of hall elements is not limited to three. The position detecting signal of the motor may be obtained using a detector different from the hall element. For example, a hall IC may be used.

The above-described flowcharts are exemplified for describing the operations, and the flowcharts are not limited to the above-described flowcharts. The steps are illustrated in the flowchart in each figure as specific examples. The steps are not limited to the flow. For example, the order of steps may be changed, another process may be inserted between the steps, and the processes may be performed in parallel.

A part or all of the processes in the above-described embodiments may be performed by software, or may be performed using a hardware circuit. For example, the control circuit is not limited to a microcomputer. In components inside the control circuit, at least a part of components may be processed by software.

The above-described embodiments should be considered in all respects as illustrative and not restrictive. The scope of the present disclosure is not defined by the description above, but is defined by the claims, and is intended to encompass meanings equivalent to the claims and all changes within the scope of the disclosure.

What is claimed is:

1. A motor driving control device comprising:
a control circuit outputting a driving control signal for driving a motor based on actual rotational frequency information on an actual rotational frequency of a rotor of the motor and speed command information on a rotational frequency of the motor; and
a motor driving part outputting, based on the driving control signal output from the control circuit, a driving signal to the motor to drive the motor,
wherein the control circuit includes:
a current detecting part detecting a driving current of the motor;
a set duty generating part generating a set duty for outputting the driving control signal based on the speed command information and the actual rotational frequency information;
a reference voltage determining part determining a limit value which is a voltage value that is a current limit value based on the set duty and an instructed duty corresponding to the speed command information; and
a limiting part limiting the driving current of the motor based on a detected voltage value on the basis of the driving current of the motor detected by the current detecting part and the limit value determined by the reference voltage determining part.

2. The motor driving control device according to claim 1, wherein
the reference voltage determining part determines a first threshold based on the instructed duty, and switchably determines whether the limit value is to be set to a first limit value or a second limit value lower than the first limit value in response to a result of comparing the set duty and the first threshold.

3. The motor driving control device according to claim 2, wherein
the reference voltage determining part determines the first threshold based on a value of multiplying the instructed duty by a predetermined first coefficient.

4. The motor driving control device according to claim 2, wherein
the reference voltage determining part determines the limit value to be the second limit value when the set duty continuously exceeds the first threshold for a first predetermined time period.

5. The motor driving control device according to claim 2, wherein
the reference voltage determining part determines a second threshold smaller than the first threshold based on the instructed duty, and switchably determines whether the limit value is to be set to the first limit value or the second limit value in response to a result of comparing the set duty and the first threshold and a result of comparing the set duty and the second threshold.

6. The motor driving control device according to claim 5, wherein
the reference voltage determining part determines the second threshold based on a value of multiplying the instructed duty by a predetermined second coefficient.

7. The motor driving control device according to claim 5, wherein
the reference voltage determining part determines the limit value to be the first limit value when the set duty is continuously smaller than the second threshold for a second predetermined time period.

8. The motor driving control device according to claim 5, wherein
the reference voltage determining part determines the first threshold and the second threshold to be fixed values, respectively when the instructed duty is a predetermined value or less.

9. The motor driving control device according to claim 1, wherein
the limiting part limits the driving current of the motor by switching whether or not the driving control signal is output based on the set duty.

10. A motor driving control method of driving a motor, the motor comprising:
a control circuit outputting a driving control signal for driving the motor based on actual rotational frequency information on an actual rotational frequency of a rotor of the motor and speed command information on the rotational frequency of the motor;
a motor driving part outputting, based on the driving control signal output from the control circuit, a driving signal to the motor to drive the motor; and
a current detecting part detecting a driving current of the motor, and
the motor driving control method comprising:
a set duty generating step of generating a set duty for outputting the driving control signal based on the speed command information and the actual rotational frequency information;
a reference voltage determining step of determining a limit value which is a voltage value that is a current limit value based on the set duty and an instructed duty corresponding to the speed command information; and
a limiting step of limiting the driving current of the motor based on a detected voltage value on the basis of the driving current of the motor detected by the current detecting part and the limit value determined by the limit value determining step.

* * * * *